United States Patent
Moraru et al.

(10) Patent No.: US 10,356,561 B2
(45) Date of Patent: Jul. 16, 2019

(54) TRACKING A PERSON IN A GROUP OF PEOPLE

(71) Applicant: INTEL CORPORATION, Santa Clara, CA (US)

(72) Inventors: Catalin Moraru, Bucharest (RO); Silviu Petria, Stilpeni (RO)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 15/754,781

(22) PCT Filed: Sep. 25, 2015

(86) PCT No.: PCT/US2015/052165
§ 371 (c)(1),
(2) Date: Feb. 23, 2018

(87) PCT Pub. No.: WO2017/052577
PCT Pub. Date: Mar. 30, 2017

(65) Prior Publication Data
US 2018/0249295 A1    Aug. 30, 2018

(51) Int. Cl.
*H04W 4/02* (2018.01)
*H04W 4/08* (2009.01)
(Continued)

(52) U.S. Cl.
CPC ............ *H04W 4/029* (2018.02); *H04W 4/02* (2013.01); *H04W 4/024* (2018.02); *H04W 4/08* (2013.01);
(Continued)

(58) Field of Classification Search
CPC ..... H04W 4/023; H04W 4/021; H04W 4/022; H04W 4/026; H04W 4/08; H04W 4/21;
(Continued)

(56) References Cited

U.S. PATENT DOCUMENTS

2005/0143096 A1*  6/2005  Boesch ................ G01S 5/0027
                                                            455/456.3
2007/0037568 A1*  2/2007  Warner ................ G01S 5/0289
                                                            455/422.1
(Continued)

FOREIGN PATENT DOCUMENTS

KR        20130068563 A      6/2013

OTHER PUBLICATIONS

International Search Report and Written Opinion, Application No. PCT/US2015/052165, dated Jun. 24, 2016, 11 pages.

*Primary Examiner* — George Eng
*Assistant Examiner* — Umair Ahsan
(74) *Attorney, Agent, or Firm* — International IP Law Group, P.L.L.C.

(57) ABSTRACT

A method and apparatus for tracking a person in a group of people. An example method includes establishing an ad-hoc network between mobile devices for each of the people in the group. A distance from a mobile device for a person in the group is determined to a mobile device for a group leader, based at least in part, on a number of hops between the mobile device for the person and mobile devices for other people in the group to reach the mobile device for the group leader. A direction to the mobile device for the group leader is determined, based at least in part, on the number of hops to reach the mobile device for the group leader by a number of paths.

25 Claims, 7 Drawing Sheets

(51) Int. Cl.
*H04W 4/40* (2018.01)
*H04W 4/80* (2018.01)
*H04W 4/021* (2018.01)
*H04W 4/024* (2018.01)
*H04W 4/029* (2018.01)
*H04W 84/18* (2009.01)
*H04W 88/02* (2009.01)
*H04W 4/04* (2009.01)

(52) U.S. Cl.
CPC ............... *H04W 4/40* (2018.02); *H04W 4/80* (2018.02); *H04W 84/18* (2013.01); *H04W 88/02* (2013.01); *H04W 4/021* (2013.01); *H04W 4/023* (2013.01); *H04W 4/046* (2013.01)

(58) Field of Classification Search
CPC ....... H04W 84/18; H04W 8/14; H04W 4/029; H04W 4/024; H04W 4/80; H04W 4/40; H04W 84/01; G01C 21/20; G01S 5/0009; G01S 5/0072; G01S 5/0289
See application file for complete search history.

(56) References Cited

U.S. PATENT DOCUMENTS

| | | | |
|---|---|---|---|
| 2008/0096519 A1 | 4/2008 | Miegel | |
| 2012/0008526 A1* | 1/2012 | Borghei | H04W 4/021 370/254 |
| 2013/0324166 A1* | 12/2013 | Mian | H04W 4/021 455/457 |
| 2014/0219485 A1 | 8/2014 | Jensen et al. | |

\* cited by examiner

300

400

TRACKING A PERSON IN A GROUP OF PEOPLE

CROSS REFERENCE TO RELATED APPLICATIONS

Pursuant to 35 U.S.C. § 371, this application is the United States National Stage Application of International Patent Application No. PCT/US2015/052165, filed on Sep. 25, 2015, the content of which is incorporated by reference as if set forth in its entirety herein.

TECHNICAL FIELD

The present techniques relate generally to devices for use in ad-hoc networks. More specifically the techniques relate to devices that can be used to locate people in a group event.

BACKGROUND

Managing a large group of people in activities like guided tours can be a challenging task for a guide. It does not take a very large number of people in a guided tour to make it impossible for the guide to know their whereabouts at all times. Furthermore, a guided tour group is usually comprised of people who do not previously know each other, so people going missing may be noticed very late. Thus, people may get lost or left behind. The guide has few options in this situation, besides holding the whole group at a halt in order to wait for the missing people.

Even today's tools like real time localization and digital maps are of little help. Tourists can find their way around, but do not know the location of the guide or the rest of the group. Furthermore, the global positioning system (GPS) may not work in some tourist attractions like castles or museums.

The most common solution to the tourist-group management problem is having a guide that sets sync points for the tourists, for example, all tourists should regroup after a one hour lunch at the tour bus. However, the guide has limited options to manage a situation when tourists fail to meet the time and place deadline.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The internet of things (IoT) is a concept in which a large number of computing devices are interconnected to each other and to the Internet to provide functionality and data acquisition at very low levels. For example, IoT networks may include commercial and home automation devices, such as light switches, thermostats, locks, cameras, alarms, motion sensors, and the like. Other devices may include sensors for health and fitness monitoring, such as pedometers and scales. These devices may be accessible through remote computers, smart phones, and other systems, for example, to control systems or access data.

Techniques described herein provide a navigation system that offers an always-on updated location for each of a group of people. Each individual is identified by a mobile device that requires only a horizontal link, such as an ad-hoc wireless local area network, e.g., using a Wi-Fi™ protocol, or Bluetooth® connection, in order to communicate with other mobile devices. In some examples, the system may also use the global positioning system (GPS) for improving the determination of a person's position. However, the techniques may be functional in the absence of a GPS signal, for example, in cases where the users are inside a building.

The people in the group may load an application on a mobile device that can join an ad-hoc wireless network with other devices for people in the group. While joined to the network, they may check their distance to a group leader that is considered the central point of the ad-hoc network, such as a tour guide. The mobile device for the group leader may distribute location messages through the ad-hoc mesh network. The devices for people receiving the messages may display a distance indicator and a direction indicator to the group leader. In some examples, a device may also be mounted to a vehicle, such as a tour bus, which can be joined to the network. While people are in range of the tour bus, guidance may be provided to either the tour bus or the guide.

Further, the system may alert the group leader when a person in the group is outside of a selected distance from the guide. This function, termed geofencing herein, may also alert the person, for example, by sounding a tone on the person's device. The person may then use the application to navigate back to the group leader. Similarly, the group leader may use the application to locate the person.

Figure 1:
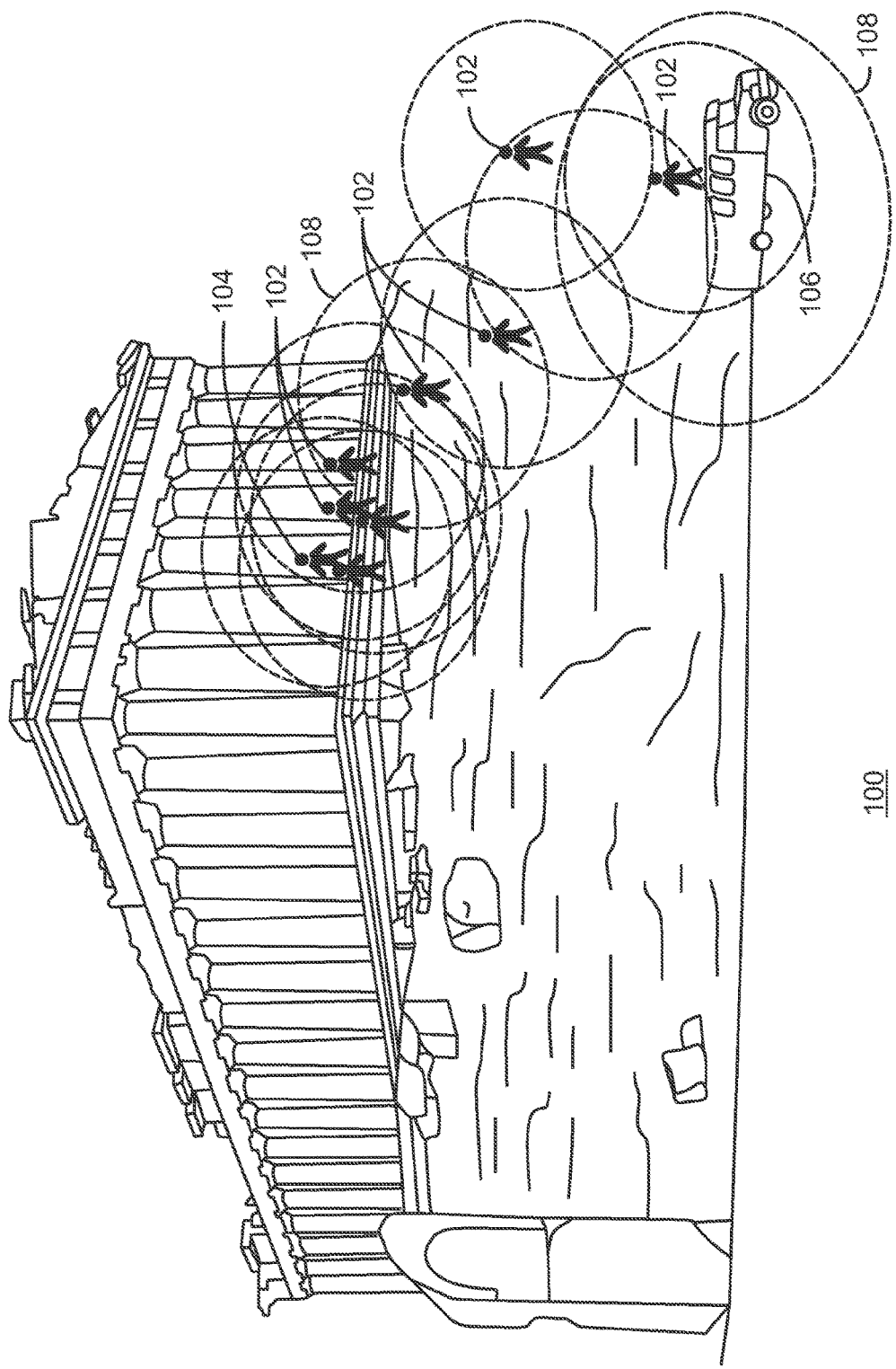
FIG. 1 is a drawing of an outdoor area, illustrating the use of an ad-hoc network between mobile devices to locate a person in a group of people.

FIG. 1 is a drawing of an outdoor area 100, illustrating the use of an ad-hoc network between mobile devices to locate a person in a group of people. The ad-hoc network can be established using any number of radio transceivers. For example, people in a group can connect to this network by using a Wi-Fi™ transceiver (e.g., to participate in a wireless local area network), a Bluetooth® transceiver, or both on their mobile device 102, and a special navigation application (app) installed on the device. Similarly, a mobile device 104 associated with a group leader, and a device mounted on a vehicle 106 may also connect to the network.

Each of the devices 102, 104, and 106 has a range 108 of connectivity that overlaps other devices 102, 104, and 106. The diameter of the range 108 for each mobile device 102 may depend on the type of device and transceiver used, such as a Wi-Fi™ or a Bluetooth® connection among others. For example, the Wi-Fi™ connection may have a greater range than a Bluetooth® connection.

The infrastructure of the ad-hoc network may have the ability to route messages between mobile devices without access to an uplink. The result is a mesh network that may interconnect any two devices with the use of other intermediary mobile devices, based on proximity of Wi-Fi™ or Bluetooth® equipped devices 102, 104, or 106. In some examples, a secondary communications channel, such as a wireless wide area network or mobile service, may be used if two devices have lost connection with each other.

On top of the mesh network infrastructure one node may be distinguished from the others. This node, which may be termed the central reference node (CRN), may be considered to be the center of the network. The group leader's mobile device 104 represents the CRN of the ad-hoc network. In some examples, a second reference node (SRN) may be used, for example, as the device 106 mounted on the vehicle. The other mobile devices 102 may compute a relative distance to one or both of these nodes. For example, the relative distance may be represented by the number of routing hops needed to transmit a message to the CRN.

A network node, such as mobile device 102 for a tourist, uses the mesh network to ping the CRN, e.g., the mobile device 104 for a guide, thus finding the relative distance to the guide or group leader. The ad-hoc mesh network enables a number of different functionalities, such as determination of relative distance and direction.

Figure 2:
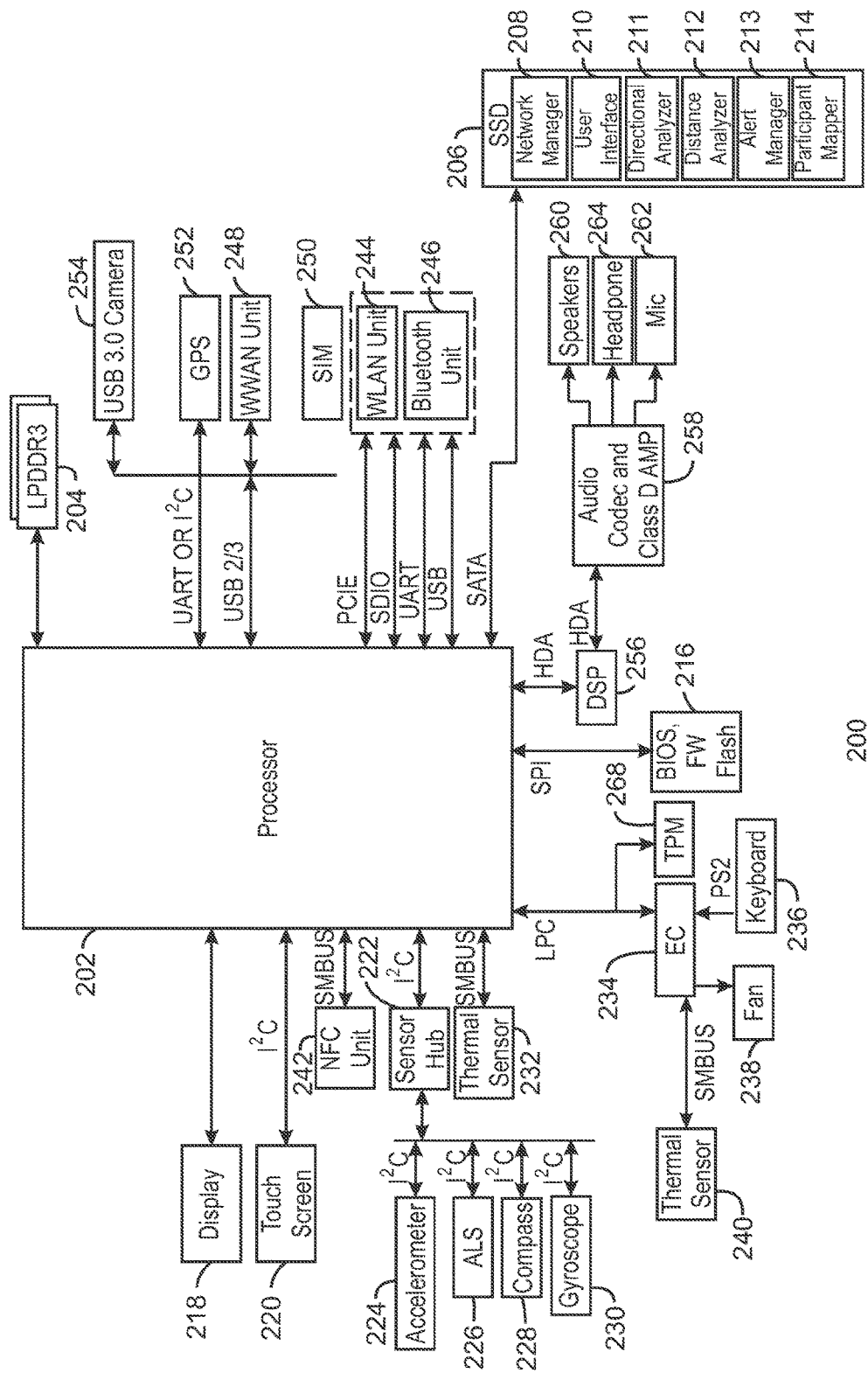
FIG. 2 is a block diagram of components that may be present in a device used for tracking people in group.

FIG. 2 is a block diagram of components that may be present in a device 200 used for tracking people in group. The device 200 may include any combinations of the components. The components may be implemented as ICs, portions thereof, discrete electronic devices, or other modules, logic, hardware, software, firmware, or a combination thereof adapted in the device 200, or as components otherwise incorporated within a chassis of the device 200. The block diagram of FIG. 2 is intended to show a high level view of many components of the device 200. However, some of the components shown may be omitted, additional components may be present, and different arrangement of the components shown may occur in other implementations. The device 200 may be a cellular telephone, a tablet, or a proprietary device, for example, loaned or handed out by a tour company, among others.

The device 200 may include a processor 202, such as a microprocessor, a multi-core processor, a multithreaded processor, an ultra-low voltage processor, an embedded processor, or other known processing element. In the illustrated implementation, processor 202 acts as a main processing unit and central hub for communication with many of the various components of the device 200. As one example, processor 202 is implemented as a system on a chip (SoC). As a specific illustrative example, processor 202 includes an Intel® Architecture Core™ based processor, such as an Atom, an i3, an i5, an i7 or another such processor available from Intel Corporation, Santa Clara, Calif. However, other low power processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an apple A5/A6 processor, a Qualcomm Snapdragon processor, or TI OMAP processor.

The processor 202 may communicate with a system memory 204. Any number of memory devices may be used to provide for a given amount of system memory, including random access memory RAM, static RAM, and any number of other types. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, one or more operating systems and so forth, a storage device 206 may also couple to the processor 202. To enable a thinner and lighter system design the mass storage may be implemented via a solid state disk drive (SSD). However, the storage device 206 may be implemented using a micro hard disk drive (HDD) in some devices 200. The storage device 206 may include a number of modules to implement the functions described herein.

These modules may be part of a navigation app used to track people in an outdoor group. For example, a network manager 208 may be included to manage participation of the mobile device in the ad-hoc network, for example, to load the app and register the device 200. The network manager 208 may also instruct the device 200 to join the ad-hoc network, and transfer packets to other devices 200 in the ad-hoc network.

A user interface 210 may display direction and distance to a group leader's device 200, a device 200 on a vehicle, or to a person's device 200 in the group. A directional analyzer 211 may be used to determine the direction a person needs to move to reach the group leader's device 200 or the device 200 mounted on the vehicle. For example, this may be displayed by the user interface 210 as an arrow indicating the direction a user needs to move to reach the group leader or the vehicle. A distance analyzer 212 may be used to determine the estimated distance, in hops or physical units, to the group leader or to a person in the group. The distance may be displayed by the user interface 210 as a number under the arrow indicating direction. As distance may be more accurate with more participants in the ad-hoc network, the user interface 210 may include setting allowing the user to switch the distance display between number of hops, physical units, or off. An alert manager 213 may sound an alert on a person's device 200 if the distance to the group leader's device 200 passes outside of a geofence, or determined range. Similarly, the alert manager 213 on the group leader's device 200 may sound an alert if a person's device 200 is outside of the geofence. A participant mapper 214 may be included on the group leader's device 200, or on all devices 200, to display a map of the locations of people in the group.

Also shown in FIG. 2, a flash device 216 may be coupled to the processor 202, e.g., via a serial peripheral interface (SR). The flash device 216 may provide for non-volatile storage of system software, including a basic input/output software (BIOS) as well as other firmware of the system.

Various input/output (I/O) devices may be present within the device 200. Specifically shown in the embodiment of FIG. 2 is a display 218 which may be a high definition LCD or LED panel. This display panel may also provide for a touch screen 220, e.g., adapted externally over the display 218 such that via a user's interaction with the touch screen 220, user inputs can be provided to the device 200 to enable desired operations, e.g., for making phone calls, accessing a navigation app, determining the location of a person in a group, and so forth. In one embodiment, the display 218 may be coupled to processor 202 via a display interconnect that can be implemented as a high performance graphics interconnect. Touch screen 220 may be coupled to processor 202 via another interconnect, which in an embodiment can be an I2C interconnect.

The device 200 may provide for a display multi-touch panel that allows selection of items, pinch zoom, and other functionality for a mobile device. In one embodiment, the touch screen may have a damage and scratch-resistant glass and coating, such as Gorilla Glass™ or Gorilla Glass 2™. The display 218 may have an edge-to-edge glass with a minimal screen bezel that is also flush with the panel surface, and limited I/O interference when using multi-touch.

For perceptual computing and other purposes, various sensors may be present within the system and may be coupled to processor 202 in different manners. Certain inertial and environmental sensors may couple to processor 202 through a sensor hub 222, e.g., via an $I^2C$ interconnect. In the embodiment shown in FIG. 2, these sensors may include an accelerometer 224, an ambient light sensor (ALS) 226, a compass 228 and a gyroscope 230, among others. Other environmental sensors may include one or more thermal sensors 232 which in some embodiments couple to processor 202 via a system management bus (SMBus) bus.

Also seen in FIG. 2, various peripheral devices may couple to processor 202, for example, via a low pin count (LPC) interconnect. In the embodiment shown, various components can be coupled through an embedded controller 234. Such components can include a keyboard 236 (e.g., coupled via a PS2 interface), a fan 238, and a thermal sensor 240.

In a particular implementation, peripheral ports may include a high definition media interface (HDMI) connector (which can be of different form factors such as full size, mini or micro). The device 200 can include one or more USB ports, such as a micro-USB port in accordance with the Universal Serial Bus Revision 3.0 Specification (November 2008) for data transfer and charging of a battery in the device. Other ports may include an externally accessible card reader such as a micro size SD-XC card reader and/or a SIM card reader for WWAN, e.g., an 8 pin card reader. For audio, the device 200 can include a 3.5 mm jack with stereo sound and microphone capability, e.g., combination functionality, with support for jack detection, e.g., headphone only support using microphone in the device 200 or a headphone with microphone in cable. In some embodiments, this jack can be re-taskable between stereo headphone and stereo microphone input.

The device 200 can communicate with external devices in a variety of manners, including wirelessly. In the embodiment shown in FIG. 2, various wireless modules, each of which can correspond to a radio configured for a particular wireless communication protocol, are present. One manner for wireless communication in a short range such as a near field may be via a near field communication (NFC) unit 242 which may communicate, in one embodiment with processor 202 via an SMBus. Note that devices in close proximity to each other can communicate through the NFC unit 242.

As further seen in FIG. 2, additional wireless units can include other short range wireless engines including a WLAN unit 244 and a Bluetooth® unit 246. Using WLAN unit 244, Wi-Fi™ communications in accordance with an Institute of Electrical and Electronics Engineers (IEEE) 802.11 standard can be realized, while via Bluetooth® unit 246, short range communications via a Bluetooth® protocol can occur. These units may communicate with processor 202 via any number of links, such as a USB link, a universal asynchronous receiver transmitter (UART) link, or via an interconnect according to a Peripheral Component Interconnect Express™ (PCIe™) protocol, e.g., in accordance with the PCI Express™ Specification Base Specification version 3.0 (published Jan. 17, 2007). Other protocols that may be used include a serial data input/output (SDIO) standard.

In addition, wireless wide area communications, e.g., according to a cellular or other wireless wide area protocol, can occur via a WWAN unit 248 which may couple to a subscriber identity module (SIM) 250. In addition, to enable receipt and use of location information, a GPS module 252 may also be present. Note that in the example shown in FIG. 2, the WWAN unit 248 and an integrated capture device such as a camera module 254 may communicate via a given USB protocol such as a USB 2.0 or 3.0 link, or a UART or 120 protocol. The actual physical connection of these units can be via adaptation of a NGFF add-in card to an NGFF connector configured on the motherboard, or as part of a SoC configuration, among others.

In a particular embodiment, wireless functionality can be provided modularly, e.g., with a Wi-Fi™ 802.11ac solution, e.g., add-in card that is backward compatible with IEEE 802.11abgn. This card can be configured in an internal slot, e.g., via an NGFF adapter. An additional module may provide for Bluetooth® capability, e.g., Bluetooth® 4.0 with backwards compatibility, as well as Intel® Wireless Display functionality. An additional module may be a WWAN device that can provide support for 3G/4G/LTE and GPS. This module can be installed in an internal slot, such as a NGFF. Integrated antenna support can be provided for Wi-Fi™, Bluetooth®, WWAN, NFC and GPS, enabling seamless transition from Wi-Fi_33™ to WWAN radios, wireless gigabit (WiGig) in accordance with the Wireless Gigabit Specification (July 2010), and vice versa.

The device 200 may provide for audio inputs and outputs, by an audio processor which may be a digital signal processor (DSP) 256, which may couple to processor 202 via a high definition audio (HDA) link. Similarly, the DSP 256 may communicate with an integrated coder/decoder (CODEC) and amplifier 258 that in turn may couple to output speakers 260 which may be implemented within the chassis. Similarly, the CODEC and amplifier 258 can be coupled to receive audio inputs from a microphone 262 which in an embodiment can be implemented via dual array microphones (such as a digital microphone array) to provide for high quality audio inputs to enable voice-activated control of various operations within the system. Note also that audio outputs can be provided from CODEC and amplifier 258 to a headphone jack 264. Although shown with these particular components in the embodiment of FIG. 2, understand the scope of the present techniques are not limited in this regard.

In some examples, a security module such as a TPM can be integrated into a processor or can be a discrete device such as a TPM 2.0 device 268. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display. This may be used by the navigation app to provide a higher security connection between devices 200 in the group.

Through the wireless connection devices, e.g., the WLAN unit 244 or the Bluetooth® unit 246, the device 200 may participate in an ad-hoc network with other devices 200. The network infrastructure has the ability to route messages between mobile devices without access to an uplink. This is done by using a routing protocol at layer 2, such as the better approach to mobile ad-hoc networking (BATMAN) protocol, the optimized link state routing (OLSR) protocol, or other protocols. For example, the BATMAN protocol creates a virtual interface at layer 3 and groups all layer 2 interfaces, for Wi-Fi™ or Bluetooth® connections. Through the ad-hoc network, the computing device can determine a direction and approximate distance to a target location, for example, as described in further detail with respect to FIGS. 3 and 4.

Figure 3:
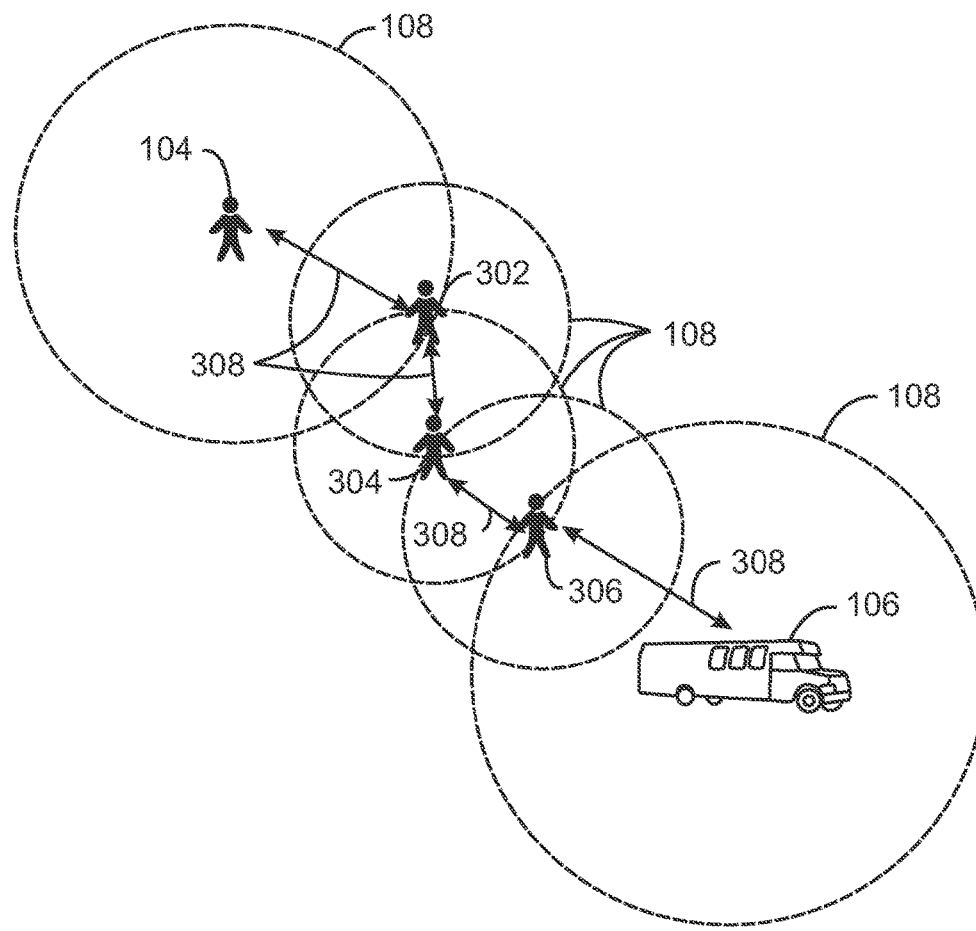
FIG. 3 is a drawing of a mesh network showing a determination of a distance to a group leader or a vehicle.

FIG. 3 is a drawing of a mesh network 300 showing a determination of a distance to a group leader 104 or a vehicle 106. Like numbered items are as described with respect to FIG. 1. Proximity detection of a person in the group is based on that person's relative distance to the other people in the group. If the person's mobile device is close enough to at least one of the other members of the group, e.g., with range of a Wi-Fi™ or Bluetooth® transceiver, then that person will be connected to the mesh network. Connectivity to the mesh network may be used to generate a relative distance and location of that tourist from the group leader 104.

In the example of FIG. 3, three people 302, 304, and 306 are positioned where the range 108 of each device overlaps with the others to form a continuous chain of links 308 from the vehicle 106 to the group leader 104. In this example, a person 306 may be informed by his device that he is at three links 308 away from the group leader 104. Further, if a person 306 is at the edge of the group, as in this example, both the group leader 104 and the person 306 are notified of a possible geofence violation which may lead to a group departure, e.g., the person losing connectivity and leaving the ad-hoc network. As noted herein, if a person 306 loses connectivity, the navigation app may default to another communications technique, such as sending an alert to the group leader 104 over a mobile phone connection.

The relative distance to the desired interest is based on the lowest number of hops needed for a broadcast message from the group leader 104 to reach a particular user, such as a person 302, 304, or 306 in the group. The group leader 104 acts like a beacon and transmits periodic broadcast to every reachable person 302, 304, and 306 in the group. Every broadcast message contains an integer representing the number of intermediate points or hops. An intermediary point, such a device for a person 302, 304, and 306, increments this number before sending it further. After receiving a broadcast, each node sends a reply containing the relative distance. This way the group leader 104 receives regular updates of the relative position of every person 302, 304, and 306 in the group, even if a person 302, 304, or 306 is out of the line of sight. Also, the group leader 104 can send updates in a form of messages to all people 302, 304, and 306 in the group without having an uplink or direct contact with each participant, such as updates on a meeting point or hours of operation.

Figure 4:
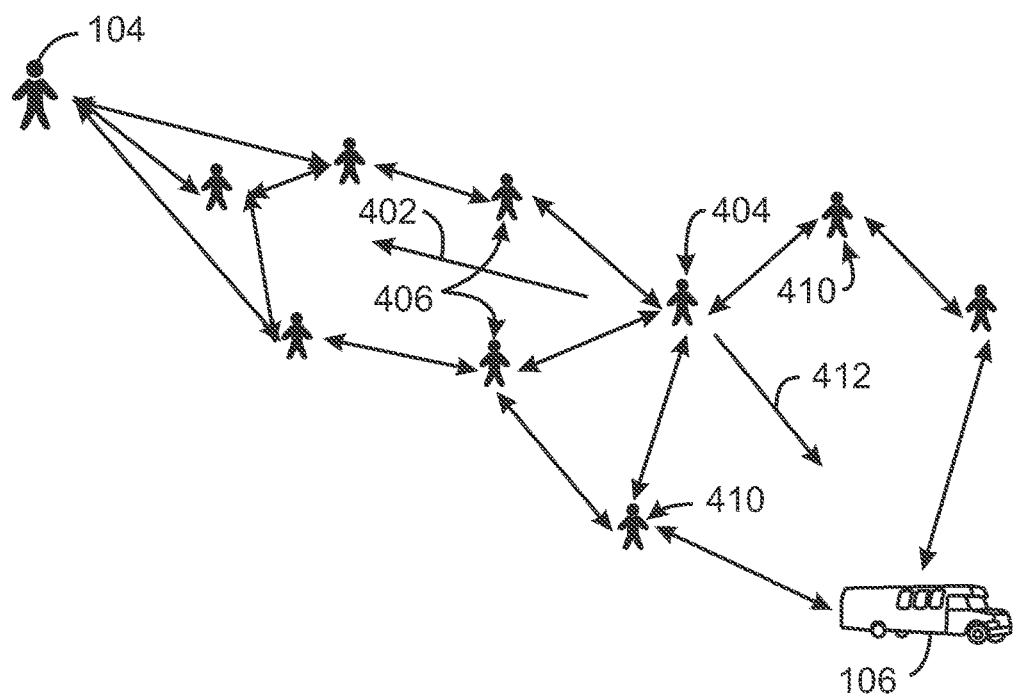
FIG. 4 is a drawing of a mesh network showing a determination of a direction to a group leader or a vehicle.

FIG. 4 is a drawing of a mesh network 400 showing a determination of a direction to a group leader 104 or a vehicle 106. Like numbered items are as described with respect to FIG. 1. The direction 402 to the group leader 104 may be determined based on the relative location of a person 404 to other people 406 that are closer to the group leader 104 versus people 410 that are farther from the group leader 104.

The direction to the people 406 and 410 that are nearest to the person 404 may be determined by detecting the direction to their proximate mobile devices based on radio technology, e.g., radio location determination. Although, this could be used to determine the direction to the group leader 104, this would only be useful when the person 404 is in direct radio range of the group leader 104.

Until the person 404 reaches that point, the device can compute a direction 402 based on the average of the direction to the closest people 406 that are in the direction of the group leader 104, as determined by the number of hops over each of a number of paths. In the example given in FIG. 4, a device for a person 404 knows, based on the number of hops to the group leader 104, that the closest neighbors are people 406. Thus, the direction 402 may be estimated based on the aggregated direction data to people 406.

In conjunction with the relative distance, the techniques may provide directions to a person 404 on how to get back to the group leader 104. In addition to the direction 402 estimated based on the nearest neighbors in the direction of the group leader 104, e.g., people 406, the directions may be given by comparing a GPS location provided in a message from the device used by the group leader 104 to a local location obtained by GPS. Similar techniques may be used to provide a direction 412 to a vehicle 106, e.g., by determining an estimated direction from people 410 that are closer to the vehicle 106. If a person 404 moves to the vehicle 106, for example, tiring of a tour, a message may be sent to the group leader 104. The group leader 104 may then instruct the navigation application on the device belonging to the person 404 to activate a geofence around the vehicle 106, informing the group leader 104, or another person, such as a driver, if the person 404 leaves the vicinity of the vehicle 106.

Directions given to a person 404 relative to other group members are useful for people that are in the mesh network 400. This approach has the advantage of working even in places where GPS does not work, such as inside of structures.

Figure 5:
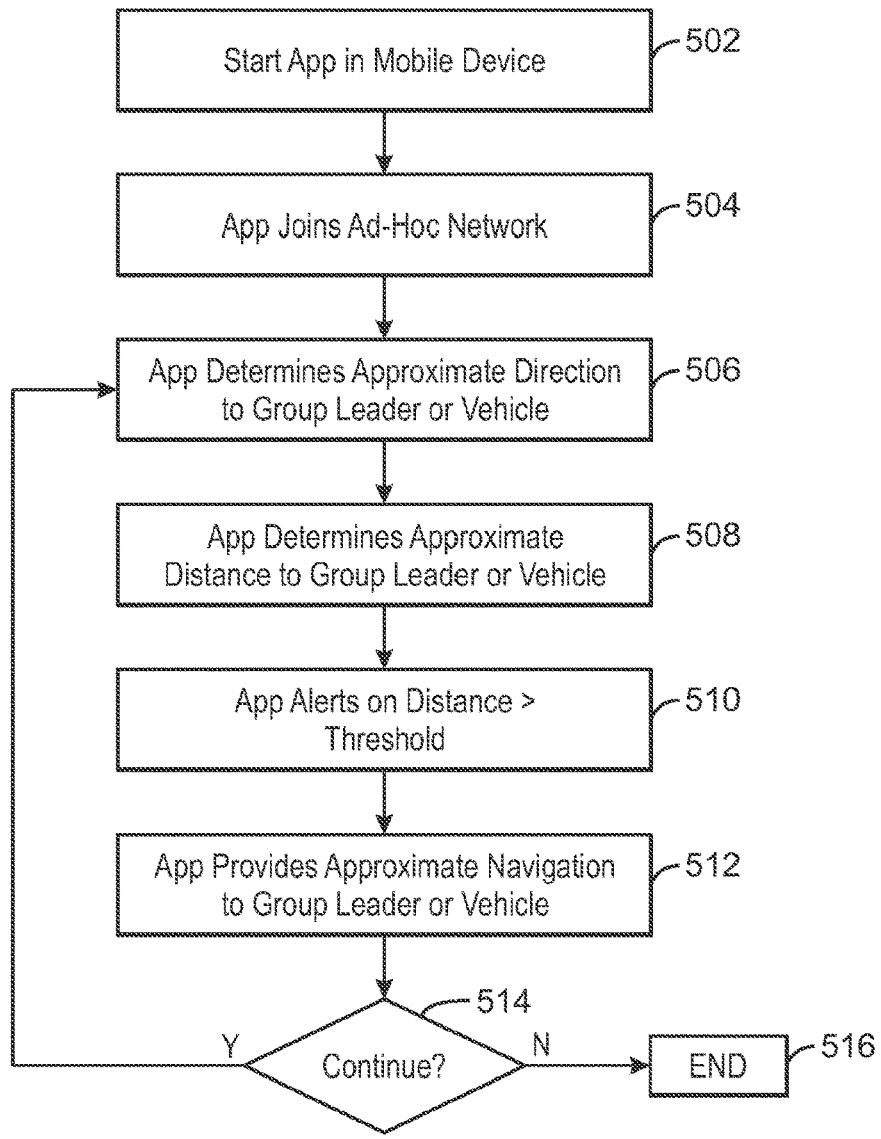
FIG. 5 is a method for using an ad-hoc network to locate a group leader or a vehicle.

FIG. 5 is a method 500 for using an ad-hoc network to locate a group leader or a vehicle. The method 500 may be implemented by mobile devices held by people in a group, such as tourists on an excursion. The method 500 begins at block 502 when a person in a group starts a navigation app in a mobile device. As described herein, the app may be downloaded to the mobile device, and registered with an app on a group leader's mobile device.

At block 504, the app joins an ad-hoc network, for example, by communicating with proximate devices registered in the group, such as the group leader's device, other person's devices, and any devices associated with a vehicle.

At block 506, the app may determine an approximate direction to a target, such as a group leader, a vehicle, or both. As described, this may be performed by determining a relative direction from devices in a mesh network that are closer to the target. Alternatively, the direction determination may be performed by comparing a current position to a last message from the target that included a GPS position.

At block 508, the application may determine a distance to the target. This may be determined, from radio direction location, or from information about the environment provided by the ad-hoc network. In one embodiment, the distance determination may be based on the number of hops to the target. In some embodiments, the distance may be determined by comparing a current GPS location to a previous known location for the target.

At block 510, the navigation app alerts on the distance from the target being greater than a threshold, e.g., if a person is outside of a geofence determined by the group leader. The alert may be a tone or vibration on the person's mobile device. In some embodiments, the mobile device may be set to sound a very loud tone to assist in locating the person.

At block 512, the app displays navigation information, such as the direction and distance to the target. The person may then use this information to navigate to the target.

At block 514, the app determines if it should continue navigation. For example, the excursion may have ended, and the group leader sends a message to the app to stop reporting. As another example, the person may cancel the navigation on the app. If navigation is to continue, process flow returns to block 506. If not, the navigation ends at block 516. In this case, the app may send a final message to the group leader's device, informing the group leader that the person has terminated participation, and giving a final position for the person.

Figure 6:
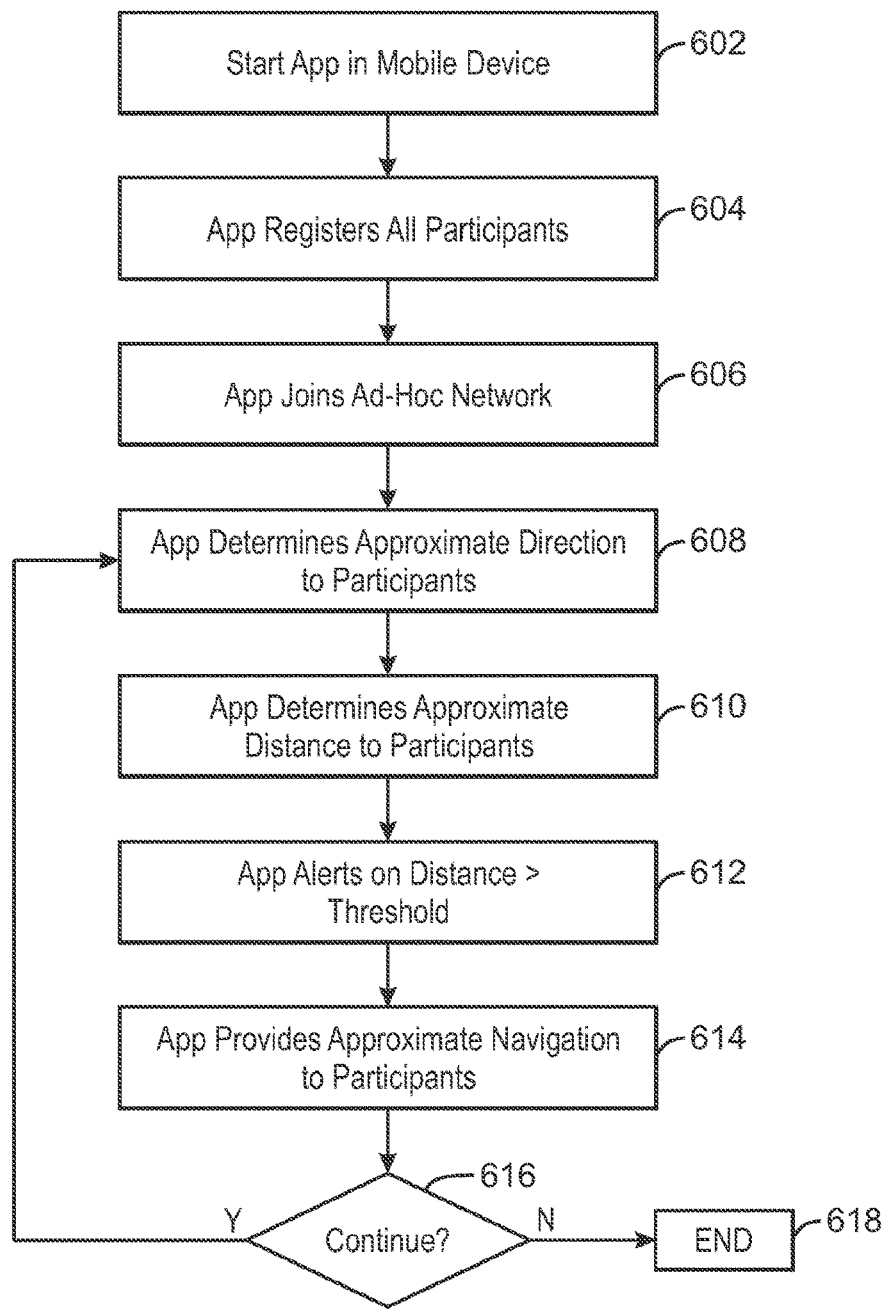
FIG. 6 is a method to locate a person in a group of people.

FIG. 6 is a method 600 to locate a person in a group of people. The method 600 may be implemented by a mobile devices held by a group leader, such as a guide on an excursion. The method 600 begins at block 602 when the group leader starts a navigation app in a mobile device. As described herein, the app may be downloaded to mobile devices for people, e.g., participants, in the group. At block 604, the app may be used to register the people in the group on the group leader's mobile device.

At block 606, the app joins an ad-hoc network, for example, by communicating with proximate devices registered in the group, such as the devices for people in the group, any devices associated with other group leaders, and any devices associated with a vehicle.

At block 608, the app may determine an approximate direction to each of the people in the group. As described, this may be performed by determining a relative direction from devices in a mesh network that are closer to each person's device. Alternatively, the direction determination may be performed by comparing a current position to a last message from the person's device that included a GPS position.

At block 610, the application may determine a distance to each of the people in the group. This may be determined, from radio direction location, or from information about the environment provided by the ad-hoc network. In one embodiment, the distance determination may be based on the number of hops to the person. In some embodiments, the distance may be determined by comparing a current GPS location to a previous known location for the person.

At block 612, the navigation app alerts the device for the group leader if the distance to a person in the group is greater than a determined range, e.g., if the person is outside of a geofence determined by the group leader. The alert may be a tone or vibration on the group leader's mobile device.

At block 614, the app displays navigation information, such as the direction and distance to the person. This may be performed by displaying a map of the locations of the people in the group, for example, showing icons for people outside the geofence in a different color. The group leader may then use this information to navigate to the person. Further, in some examples, the group leader may communicate with the person outside the geofence, such as by tapping the icon for a person on the map.

At block 616, the app determines if it should continue navigation. For example, the excursion may have ended, and the group leader sends a message to the apps on all of the people' devices to stop reporting. If navigation is to continue, process flow returns to block 608. If not, the navigation ends at block 618

Figure 7:
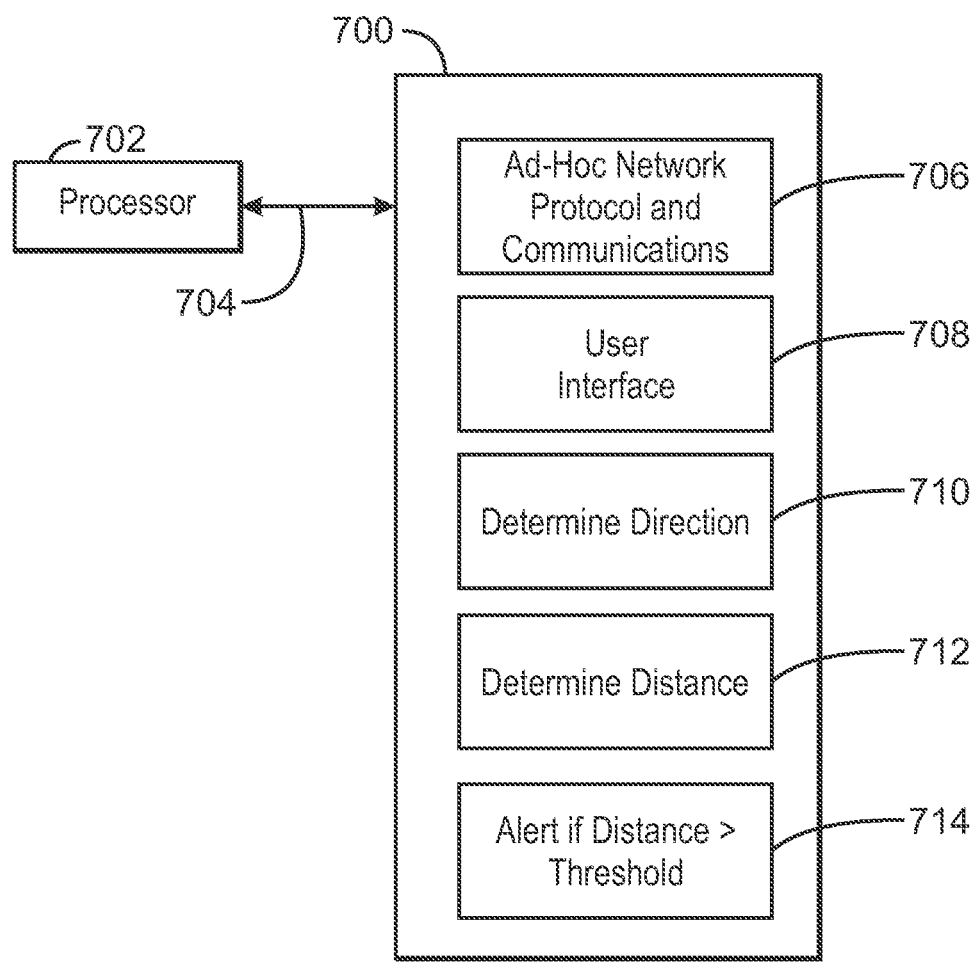
FIG. 7 is a non-transitory, machine readable medium that includes code to direct a processor, for example, in a mobile device, to track a person in a group of people.

FIG. 7 is a non-transitory, machine readable medium 700 that includes code to direct a processor 702, for example, in a mobile device, to track a person n a group of people. The processor 702 may access the code over a bus 704. The non-transitory, machine readable medium 700 includes code 706 that may direct the processor 702 to join an ad-hoc network. For example, this code 706 may direct the processor 702 to function as a router for sending peer-to-peer messages over a shortest route between a target device and a person's mobile device. Further, this code 706 may passively or actively request location information for a device belonging to a group leader.

The non-transitory, machine readable medium 700 may include code 708 that functions as a user interface. This code 708 may present a person with navigation information to reach a group leader, such as estimated direction and distance. Similarly, the code 708 for the user interface may provide a group leader with location information for all of the people in a group, or just with location information for people that have left a geofence around the group leader. Navigation information to a vehicle may also be provided by the code 708.

The non-transitory, machine readable medium 700 may include code 710 that determines a direction to a target, such as a group leader, a person in the group, or a vehicle, among others. As described herein, the direction may be determined from radio technology, e.g., determining the directions to nearby units that have shorter paths to the target. Further, the direction can be determined from comparing a last known set of GPS coordinates for the target to a current location. The GPS coordinates may be sent in regular location messages from the target, or may be returned in response to a query, such as a request from a group leader's device.

The non-transitory, machine readable medium 700 may include code 712 that determines an approximate distance to the target, such as the group leader, a person in the group, or a vehicle, among others, in hops to the target. The code 712 may use a comparison of a last known GPS location for the target to a current location to determine the distance. The code 712 to determine distance can be part of the code used to determine direction.

The non-transitory, machine readable medium 700 may include code 714 that alerts on a device if the target, such as the group leader, a person in the group, or a vehicle, among others, is outside of a determined range, e.g., a geofence. The alert may be a tone sounded when a person passes outside of the geofence. In some cases, if a device is out of short range wireless communications, a different communications technique, such as a WWAN connection may be used to send a location, for example, between a person and a group leader.

The non-transitory, machine readable medium 800 may include code 814 that alerts on a device if the target, such as the group leader, a person in the group, or a vehicle, among others, is outside of a determined range, e.g., a geofence. The alert may be a tone sounded when a person passes outside of the geofence. In some cases, if a device is out of short range wireless communications, a different communications technique, such as a WWAN connection may be used to send a location, for example, between a person and a group leader.

In examples of the present techniques, a mobile device can be used track people in a group, using an ad-hoc network generated between mobile devices for the people and a mobile device for a group leader. Other mobile devices can be added as targets, such as a mobile device mounted to a vehicle, or mobile devices for other group leaders. This may be useful in situations, such as excursions and tours, in which separation from a group leader or guide can occur.

Example 1 includes an apparatus for tracking a person in a group of people, including a mobile device. The mobile device includes a processor, a radio transceiver, a network manager to join an ad-hoc network, a directional analyzer to determine a direction to a group leader, and a distance analyzer to determine an estimated distance to the group leader.

Example 2 incorporates the subject matter of Example 1. In this example, the directional analyzer is to determine a direction to a vehicle, and the distance analyzer is to determine an estimated distance to the vehicle.

Example 3 incorporates the subject matter of any of Examples 1 and 2. In this example, the mobile device includes a participant mapper to display a map of locations for the people in the group.

Example 4 incorporates the subject matter of any of Examples 1 through 3. In this example, the mobile device includes an alert manager to alert the group leader if the person is outside of a determined range.

Example 5 incorporates the subject matter of any of Examples 1 through 4. In this example, the mobile device includes a wireless local area network (WLAN) transceiver.

Example 6 incorporates the subject matter of any of Examples 1 through 5. In this example, the mobile device includes a Bluetooth transceiver.

Example 7 incorporates the subject matter of any of Examples 1 through 6. In this example, the radio transceiver is to determine a direction to devices that the mobile device is in communication.

Example 8 incorporates the subject matter of any of Examples 1 through 7. In this example, the mobile device includes a solid state disk drive.

Example 9 incorporates the subject matter of any of Examples 1 through 8. In this example, the mobile device includes a touch screen.

Example 10 incorporates the subject matter of any of Examples 1 through 9. In this example, the mobile device includes a cellular telephone or a tablet.

Example 11 incorporates the subject matter of any of Examples 1 through 10. In this example, the mobile device includes a user interface to present navigation information to the person.

Example 12 is a method for tracking a person in a group of people. The method includes establishing an ad-hoc network between mobile devices for each of the people in the group. A distance from a mobile device for a person in the group to a mobile device for a group leader is determined, based at least in part, on a number of hops between the mobile device for the person and mobile devices for other people in the group to reach the mobile device for the group leader. A direction to the mobile device for the group leader is determined, based at least in part, on the number of hops to reach the mobile device for the group leader by a number of paths.

Example 13 incorporates the subject matter of Example 12. In this example, the method includes displaying a directional indicator on the mobile device for the person. The direction indicator indicates the direction to move to reach the mobile device for the group leader.

Example 14 incorporates the subject matter of either of Examples 12 or 13. In this example, the method includes displaying a distance indicator on the mobile device for the person. The distance indicator provides an estimate of the distance to the mobile device for the group leader.

Example 15 incorporates the subject matter of any of Examples 12, 13, or 14. In this example, the method includes sounding an alert on the mobile device for the group leader if the mobile device for the person is outside of a geofence.

Example 16 incorporates the subject matter of any of Examples 12 through 15. In this example, the method includes displaying a map on the mobile device for the group leader showing a last position estimated for the mobile device for the person.

Example 17 incorporates the subject matter of any of Examples 12 through 16. In this example, the method includes displaying a map of the mobile devices for each of the people in the group on the mobile device for the group leader.

Example 18 incorporates the subject matter of any of Examples 12 through 17. In this example, the method includes sounding an alert on the mobile device for the person if the mobile device for the group leader is outside of a geofence.

Example 19 incorporates the subject matter of any of Examples 12 through 18. In this example, the method includes determining a direction to proximate mobile devices, based at least in part, on a radio location determination.

Example 20 incorporates the subject matter of Example 19. In this example, the method includes determining the direction to the mobile device for the group leader as an average direction of the proximate mobile devices for people in the group having the lowest number of hops to the mobile device for the group leader.

Example 21 incorporates the subject matter of Example 12. In this example, the method includes joining a device mounted on a vehicle to the ad-hoc network. A distance from a mobile device for a person in the group to the device mounted on the vehicle is determined, based at least in part, on a number of hops between the mobile device for the person and mobile devices for other people in the group to reach the device mounted on the vehicle. A direction to the device mounted on the vehicle is determined, based at least in part, on the number of hops to reach the mobile device mounted on the vehicle by a number of paths.

Example 22 incorporates the subject matter of Example 21. In this example, the method includes displaying a directional indicator on the mobile device for the person. The direction indicator indicates the direction to move to reach the device mounted on the vehicle.

Example 23 incorporates the subject matter of either of Examples 21 or 22. In this example, the method includes displaying a distance indicator on the mobile device for the person. The distance indicator provides an estimate of the distance to the device mounted on the vehicle.

Example 24 is a non-transitory, machine readable medium including code for tracking a person in a group of people by directing a processor to establish an ad-hoc network between mobile devices for people in a group. The code directs the processor to determine a direction to a mobile device for a group leader from the ad-hoc network and to determine a distance to the mobile device for the group leader from the ad-hoc network.

Example 25 incorporates the subject matter of Example 24. In this example, the non-transitory, machine readable medium includes code to direct the processor to determine a direction to a device mounted on a vehicle from the ad-hoc network. The code directs the processor to determine a distance to the device mounted on the vehicle from the ad-hoc network.

Example 26 incorporates the subject matter of either of Examples 24 or 25. In this example, the non-transitory, machine readable medium includes code to sound an alert on the mobile device for the group leader if the distance to a mobile device for a person in the group is greater than a threshold.

Example 27 is an apparatus for tracking a person in a group of people, including a mobile device. In this example, the mobile device includes a means for determining a direction to a group leader and a means for determining an estimated distance to the group leader.

Example 28 incorporates the subject matter of Example 27. In this example, the mobile device includes a means for determining a direction to a vehicle and a means for determining an estimated distance to the vehicle.

Example 29 incorporates the subject matter of either of Examples 27 or 28. In this example, the mobile device includes a means for displaying a map of locations for the people in the group.

Example 30 incorporates the subject matter of any of Examples 27, 28, or 29. In this example, the mobile device includes a means for alerting the group leader if the person is outside of a determined range.

Example 31 incorporates the subject matter of any of Examples 27 through 30. In this example, the mobile device includes a means for determining a direction to devices that the mobile device is in communication.

Example 32 incorporates the subject matter of any of Examples 27 through 31. In this example, the mobile device includes a means for presenting navigation information to the person.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques described herein. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for tracking a person in a group of people, comprising a mobile device, wherein the mobile device comprises:
    a processor;
    a radio transceiver;
    a network manager to join an ad-hoc network;
    a directional analyzer to determine a direction to a group leader, based, at least in part, on a number of hops between the mobile device for the person and mobile devices for other people in the group to reach the mobile device for the group leader; and
    a distance analyzer to determine an estimated distance to the group leader, based at least in part, on a number of hops between the mobile device for the person and mobile devices for other people in the group to reach the mobile device for the group leader; and
    a display to show the direction to the group leader and the estimated distance to the group leader.

2. The apparatus of claim 1, wherein the mobile device comprises:
    the directional analyzer to determine a direction to a vehicle; and
    the distance analyzer to determine an estimated distance to the vehicle.

3. The apparatus of claim 1, wherein the mobile device comprises a participant mapper to display a map of locations for the people in the group.

4. The apparatus of claim 1, wherein the mobile device comprises an alert manager to alert the group leader if the person is outside of a determined range.

5. The apparatus of claim 1, comprising a wireless local area network (WLAN) transceiver.

6. The apparatus of claim 1, comprising a Bluetooth transceiver.

7. The apparatus of claim 1, wherein the radio transceiver is to determine a direction to devices that the mobile device is in communication.

8. The apparatus of any of claim 1, comprising a solid state disk drive.

9. The apparatus of any of claim 1, comprising a touch screen.

10. The apparatus of claim 1, wherein the mobile device comprises a cellular telephone or a tablet.

11. A method for tracking a person in a group of people, comprising:
establishing an ad-hoc network between mobile devices for each of the people in the group;
determining a distance from a mobile device for a person in the group to a mobile device for a group leader, based at least in part, on a number of hops between the mobile device for the person and mobile devices for other people in the group to reach the mobile device for the group leader; and
determining a direction to the mobile device for the group leader, based at least in part, on the number of hops to reach the mobile device for the group leader by a number of paths; and
displaying a map of the locations of the people in the group.

12. The method of claim 11, comprising displaying a directional indicator on the mobile device for the person, wherein the direction indicator indicates the direction to move to reach the mobile device for the group leader.

13. The method of claim 11, comprising displaying a distance indicator on the mobile device for the person, wherein the distance indicator provides an estimate of the distance to the mobile device for the group leader.

14. The method of claim 11, comprising sounding an alert on the mobile device for the group leader if the mobile device for the person is outside of a geofence.

15. The method of claim 11, comprising displaying a map on the mobile device for the group leader showing a last position estimated for the mobile device for the person.

16. The method of claim 11, comprising displaying a map of the mobile devices for each of the people in the group on the mobile device for the group leader.

17. The method of claim 11, comprising sounding an alert on the mobile device for the person if the mobile device for the group leader is outside of a geofence.

18. The method of claim 11, comprising determining a direction to proximate mobile devices, based at least in part, on a radio location determination.

19. The method of claim 18, comprising determining the direction to the mobile device for the group leader as an average direction of the proximate mobile devices for people in the group having the lowest number of hops to the mobile device for the group leader.

20. The method of claim 11, comprising:
joining a device mounted on a vehicle to the ad-hoc network;
determining a distance from a mobile device for a person in the group to the device mounted on the vehicle, based at least in part, on a number of hops between the mobile device for the person and mobile devices for other people in the group to reach the device mounted on the vehicle; and
determining a direction to the device mounted on the vehicle, based at least in part, on the number of hops to reach the mobile device mounted on the vehicle by a number of paths.

21. The method of claim 20, comprising displaying a directional indicator on the mobile device for the person, wherein the direction indicator indicates the direction to move to reach the device mounted on the vehicle.

22. The method of claim 20, comprising displaying a distance indicator on the mobile device for the person, wherein the distance indicator provides an estimate of the distance to the device mounted on the vehicle.

23. A non-transitory, machine readable medium comprising code for tracking a person in a group of people by directing a processor to:
establish an ad-hoc network between mobile devices for people in a group;
determine a direction to a mobile device for a group leader from the ad-hoc network, based, at least in part, on a number of hops between the mobile device for the person and mobile devices for other people in the group to reach the mobile device for the group leader; and
determine a distance to the mobile device for the group leader from the ad-hoc network, based at least in part, on a number of hops between the mobile device for the person and mobile devices for other people in the group to reach the mobile device for the group leader.

24. The non-transitory, machine readable medium of claim 23, comprising code to direct the processor to:
determine a direction to a device mounted on a vehicle from the ad-hoc network; and
determine a distance to the device mounted on the vehicle from the ad-hoc network.

25. The non-transitory, machine readable medium of claim 23, comprising code to sound an alert on the mobile device for the group leader if the distance to a mobile device for a person in the group is greater than a threshold.

* * * * *